Figure 1:
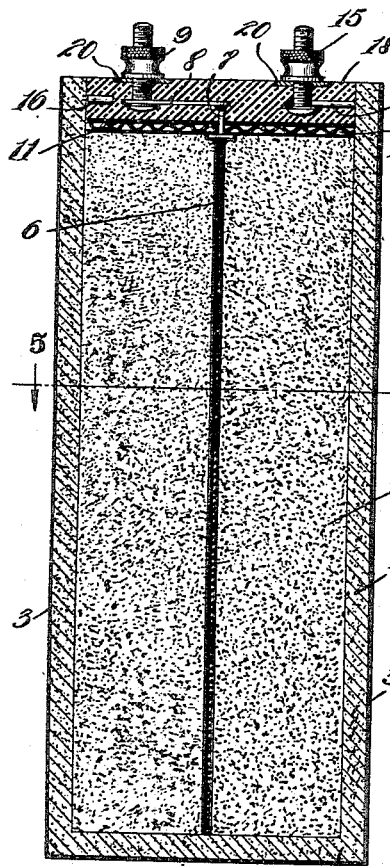

J. C. SANGERS.
BATTERY CELL.
APPLICATION FILED OCT. 15, 1917.

1,266,166.

Patented May 14, 1918.
2 SHEETS—SHEET 1.

Inventor,
John C. Sangers.
By Hull, Smith, Brock & West
Attys

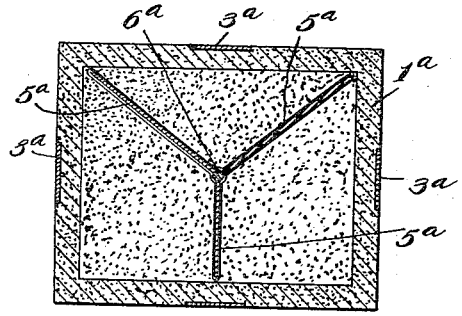
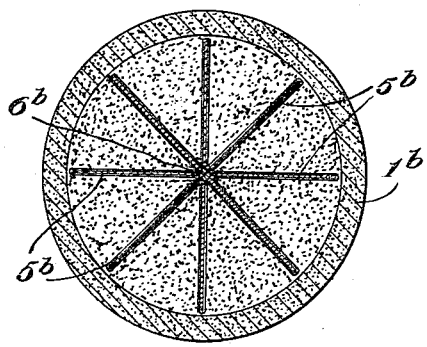
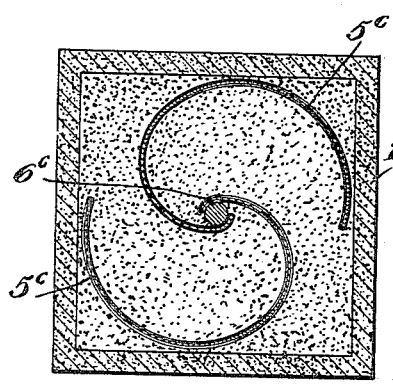
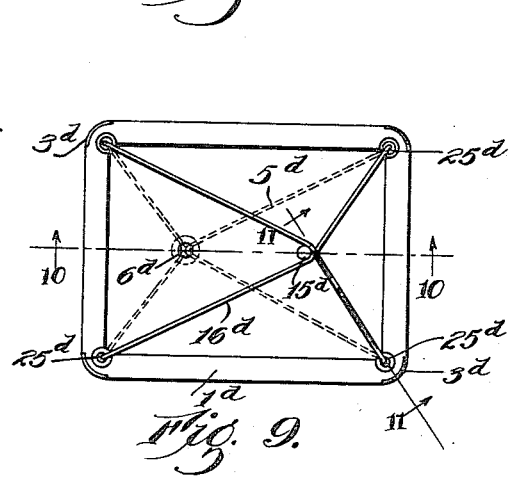
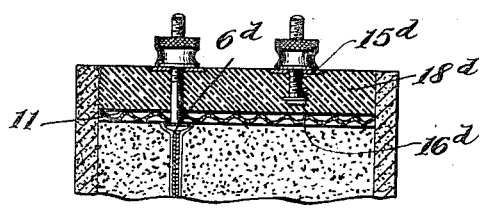
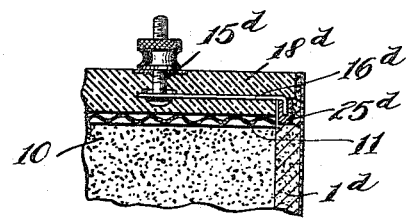
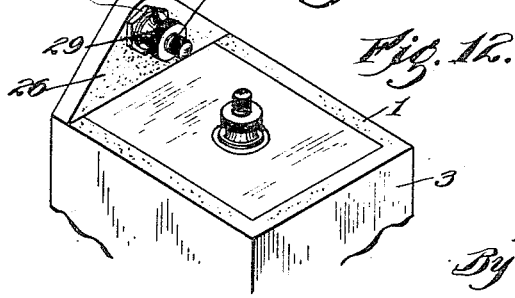

UNITED STATES PATENT OFFICE.

JOHN C. SANGERS, OF CLEVELAND, OHIO.

BATTERY-CELL.

1,266,166. Specification of Letters Patent. Patented May 14, 1918.

Application filed October 15, 1917. Serial No. 196,600.

*To all whom it may concern:*

Be it known that I, JOHN C. SANGERS, a citizen of the United States, residing at Cleveland, in the county of Cuyahoga and State of Ohio, have invented a certain new and useful Improvement in Battery-Cells, of which the following is a full, clear, and exact description, reference being had to the accompanying drawings.

This invention relates to improvements in the construction of battery cells of the so-called "dry cell" type, and has for its objects the attainment of increased efficiency (without increase in size), simplicity, and economy and ease of manufacture, in battery cells of the sort referred to.

More specifically stated, my invention has for its object to provide a construction wherein the cathode consists preferably, of a carbon receptacle, and wherein the anode is made up of a plurality of sheet zinc planes or plates longitudinally disposed within the receptacle, and is preferably of a shape that will fit within the receptacle in such a way as to be maintained by coöperation with the walls of the receptacle in proper position preparatory to being embedded in the electrolyte which is introduced into the receptacle in paste form and completely surrounds the anode and fills the cathode. It will be understood, of course, that the anode is enveloped, as usual, in a porous substance, such as pulp paper; and that a depolarizing medium may be employed. The electrolyte may consist of any suitable exciting substance. In order to increase the area of the anode without enlarging its scope, I prefer to corrugate or otherwise deform the plates whereof the wings are made.

A further object comprehended by my invention is the provision of a simple and efficient terminal for the cathode which, in its preferred form, consists of an expanding element carrying the wire connection or binding post and which may be contracted and inserted into the top of the carbon receptacle and allowed to expand into firm contact with various portions of the receptacle and accordingly maintained firm contact therewith.

In pursuance of a still further object, in order to reduce the electrical resistance of the carbon element, I may apply to the exterior of the element a substance of higher conductivity than carbon, such as copper, either in the form of a continuous coating or plating, or in the form of strips.

In the accompanying drawings I have illustrated various modifications of my invention wherein the foregoing objects are attained, and others which will become apparent as this description proceeds, and while I shall proceed to describe these various forms in detail, I wish to be understood as not limiting myself to these structural details further than is required by the terms of the claims annexed hereto.

Figure 2:
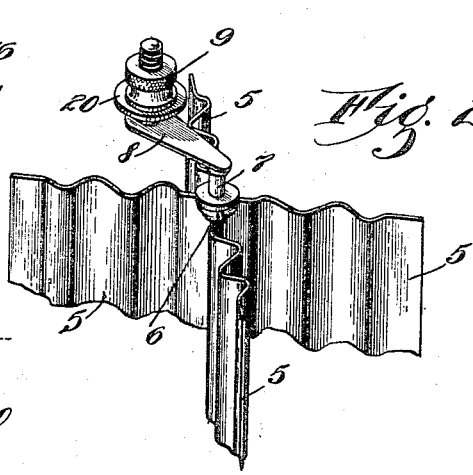
Figure 4:
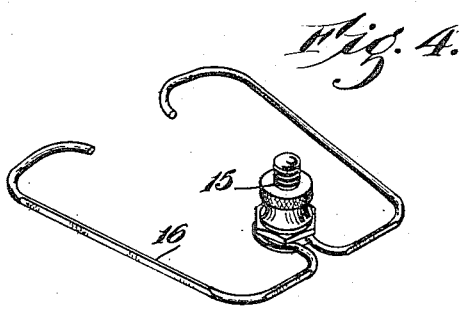
Figure 5:
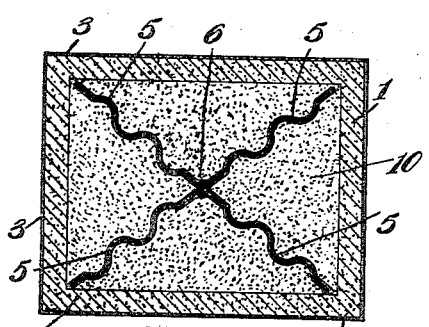
Figure 3:
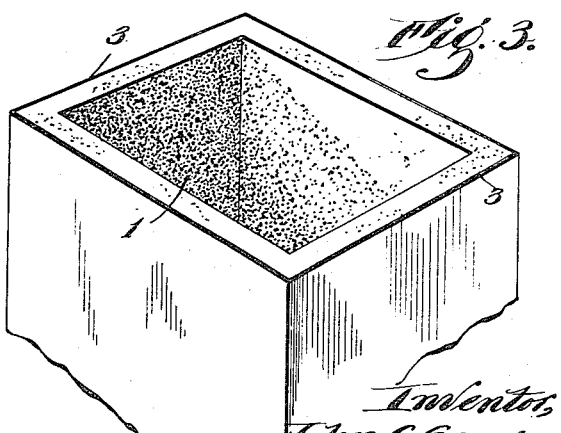

Referring to the drawings, wherein similar reference characters designate corresponding parts throughout the several views, Figure 1 is a central vertical section through a battery cell constructed in accordance with my invention; Fig. 2 is a fragmentary perspective view of the anode; Fig. 3 is a similar view of the cathode or carbon receptacle; Fig. 4 is a perspective view of the cathode terminal; Fig. 5 is a section on the line 5—5 of Fig. 1; Fig. 6 is a view, similar to Fig. 5, of an embodiment of the invention differing from the former modification in that the anode has three instead of four wings, and the carbon receptacle is equipped with strips rather than a coating of material of relatively high conductivity; Fig. 7 is a horizontal section of an embodiment of the invention comprising a cylindrical receptacle and an anode of several wings designed to fit it; Fig. 8 shows, in horizontal section, a square receptacle and an anode having two wings that are shaped to give them comparatively large area, and so as to properly position the anode within the receptacle; Fig. 9 shows a modification wherein the carbon receptacle is rectangular in horizontal section and has metallic corner stays of comparatively high conductivity, and is equipped with a terminal peculiarly adapted to the corner stay arrangement; Figs. 10 and 11 are sectional details on lines 10—10 and 11—11, respectively, of Fig. 9; and Fig. 12 is a fragmentary perspective view of a modified form of the carbon receptacle.

In the present preferred form of my invention, illustrated in Figs. 1 to 5, the cathode comprises a carbon receptacle 1, which may have an integral bottom 2, and is rectangular in cross section, as shown particularly in Fig. 5. To enhance its conductivity, as above explained, I may plate or coat the exterior of the receptacle with a suitable metal, such as copper, as indicated at 3.

This exterior coating of the cathode with metal of relatively high conductivity (or other modifications of the same idea hereinafter described) provides a path of less resistance than that afforded by the carbon for the current as it flows from remote portions of the cathode to the terminal thereof. For example current transmitted from the lower portion of the anode to the adjacent portion of the cathode is rapidly conducted to the cathode terminal by the exterior layer or coating of metal. In other words the path of current through the cathode is shortened to substantially the thickness of the wall of the carbon receptacle.

In the present modification, the anode comprises four wings 5 of zinc, which radiate from a common center or axis 6, and terminal 7 projects from one end of the anode, coincident with the axis 6, and is shown as having a lateral portion 8 to the end of which a binding post 9 is connected, the purpose of the lateral extension 8 being hereinafter explained. The wings 5 are shown as corrugated longitudinally to increase their area while restricting them to the inside dimensions of the receptacle. The anode is completely incased in an envelop of porous material, such as pulp paper, as is usual in cells of this character.

A suitable electrolyte, indicated at 10, is contained within the receptacle and tamped firmly about the anode, and is preferably covered above the anode, by a piece of corrugated paper, indicated at 11, which is cut to fit the receptacle and is perforated at its center for the passage of the terminal 7. The longitudinal disposition of the zinc plates or planes of the anode within the receptacle greatly facilitates the tamping of the electrolyte about the anode through the open end of the receptacle and by the use of prevailing methods, thus tending further to minimize the cost of production.

The binding post 15, which constitutes the terminal of the cathode (or the positive terminal of the cell) is carried by a spring element 16 which is shaped to fit within the receptacle and contact firmly with the four walls thereof the same being normally of a size greater than the interior dimension of the receptacle so that, when placed within the receptacle, it will exert, through its inherent resiliency, a firm contact with the walls of the receptacle. Where the spring element bears against the receptacle, it may be flattened to increase its surface contact with the cathode. In the design shown, the binding post is set inward from one side of the receptacle, and the anode terminal, as previously explained, is set off laterally from the center of the anode, so as to make the arrangement of the binding post symmetrical. Above the piece of corrugated paper 11, the receptacle is filled with an air and moisture excluding substance 18, such as sealing wax, and this substance completely surrounds the spring element 16 and maintains it permanently in firm contact with the walls of the receptacle. Metallic washers 20 may be embedded in the upper surface of the substance 18 to provide suitable bearing for wire connections beneath the thumb nuts of the binding posts or terminals.

From the description so far it will be seen that my invention provides a comparatively simple construction for dry cell batteries, such as will permit of ease and economy in manufacture; and its extremely high efficiency will be acknowledged and appreciated by those familiar with "dry-cell" battery construction and operation.

In Fig. 6 I have shown a modification wherein the carbon receptacle $1^a$ is rectangular in cross-section as before, and the anode comprises three flat wings $5^a$ having a common center or axis $6^a$. In substitution for the metallic coating 3 of the previous form, the receptacle is provided with metal strips $3^a$, set into the outer surface of its four walls. In other respects, this modification may conform to that above.

In Fig. 7 the receptacle $1^b$ is shown as cylindrical and contains an electrode comprising a plurality of wings $5^b$ which radiate from a common center $6^b$.

Fig. 8 illustrates a form of the invention wherein the casing $1^c$ is square in cross-section and contains an anode made up of curved wings $5^c$ which extend, in a spiral direction from opposite sides of a central post $6^c$, the wings sweeping outward into close proximity to the walls of the casing, thereby to properly position the anode within the receptacle.

The casing in the modification illustrated in Fig. 9 is made up of a tubular carbon element that is rectangular in cross-section, and the bottom of the casing may be made of a substance similar to that which fills the upper end of the form shown in Fig. 1. The anode, in this instance, is made up of wings $5^d$, which extend from a common axis or "center" $6^d$ that is located to one side of the center of the cell, the wings on one side being considerably wider than those on the other so that their outer edges occupy the corners of the receptacle. In this case, the terminal rises directly from the point at which the wings meet. The terminal $15^d$ of the cathode is carried by wires $16^d$, each wire having its opposite ends located at diagonally opposite corners of the receptacle and turned downward and embedded in plugs 25 of a suitable metal which is poured, in molten condition, into bores extending downward from the recessed corners of the receptacle and which, by its nature, expands in the process of cooling into firm contact with the walls of the bore and thus makes very firm contact both with the wire and electrode. Where the wires 16ᵈ cross, they have connected to them the binding post 15ᵈ, and the wires and adjacent portions of the binding post are embedded in the sealing material 18ᵈ. The sealing material is omitted in Fig. 9 to show the construction of the terminal. In this case, the receptacle has metallic corner stays 3d which function as the former strips 3ª, or coating 3, while serving also to protect the carbon receptacle against breakage.

A simple, inexpensive, and very practical form of terminal for the cathode is shown in Fig. 12, as consisting of an integral extension 26 of one side wall of the carbon receptacle. A screw 27 passes through an aperture in the extension and is held in place by a nut 28, the protruding end of the screw constituting a binding post to which the usual thumb nut 29 is applied.

Having thus described my invention what I claim is:—

1. In a battery cell of the character set forth, the combination of a carbon receptacle that is rectangular in cross-section and having an integral bottom, an anode within the receptacle comprising a plurality of zinc plates extending from a common axis into close proximity to the walls of the receptacle, said anode being incased within a porous envelop and surrounded by an electrolyte, and a sealing substance closing the end of the receptacle beyond the anode, the anode and receptacle being provided each with a connection, that of the anode extending through the sealing substance.

2. In a battery cell of the character set forth, the combination of a carbon receptacle that is rectangular in cross-section and having an integral bottom, an anode within the receptacle comprising a plurality of zinc plates radiating from a common axis toward and in close proximity to the corners of the receptacle, the anode being incased within a porous envelop and surrounded by an electrolyte, a sealing substance closing the end of the casing beyond the anode, the carbon receptacle and anode being provided with connections, that of the anode extending through the sealing substance.

3. A battery cell of the character set forth comprising a carbon receptacle coated with a substance of higher conductivity than carbon, an anode within the receptacle and incased within a porous envelop and surrounded by an electrolyte, the anode having a terminal extending beyond the open end of the receptacle, a terminal carried by the receptacle, and a sealing substance closing the open end of the receptacle.

4. A battery cell of the character set forth comprising a carbon receptacle, a substance of greater conductivity than carbon applied to the exterior of the receptacle, an anode contained within the receptacle and incased within a porous envelop and surrounded by an electrolyte, the anode having a terminal extending beyond the open end of the receptacle, a terminal carried by the receptacle, and a sealing substance closing the open end of the receptacle.

5. In a battery cell of the character set forth, the combination of a receptacle comprising a cathode, an anode within the receptacle and comprising a plurality of sheet zinc plates arranged longitudinally within the receptacle and extending from a common axis, the anode being incased within a porous envelop and surrounded by an electrolyte, means sealing the end of the receptacle, and means for connecting a conductor to the anode.

6. In a battery cell of the character set forth, the combination of a polygonal receptacle comprising a cathode, an anode consisting of a plurality of vertically disposed sheet zinc plates radiating from a common axis into close proximity to the corners of the receptacle thereby to properly position the anode within the receptacle, the anode being incased within a porous envelop and surrounded by an electrolyte, means sealing the end of the receptacle, and means for connecting a conductor to the anode.

7. An anode comprising a plurality of sheet zinc plates extending from a common axis and disposed longitudinally thereof.

8. In a dry cell, the combination of a receptacle comprising a cathode, an anode comprised of sheet zinc planes extending longitudinally of and located within the receptacle thereby to permit electrolyte to be tamped about the planes through an open end of the receptacle, the anode being incased within a porous envelop and surrounded by an electrolyte, means sealing the end of the receptacle, and means for connecting a conductor to the anode.

In testimony whereof, I hereunto affix my signature.

JOHN C. SANGERS.